United States Patent Office 2,893,973
Patented July 7, 1959

2,893,973
LIQUEFIED M-PHENYLENEDIAMINE COMPOSITIONS FOR CURING EPOXY ETHER RESINS

Robert Steckler, Russell, Ohio, Frederick A. Hessel, Upper Montclair, N.J., and Jesse Werner, Holliswood, N.Y., assignors to General Aniline & Film Corporation, New York, N.Y., a corporation of Delaware No Drawing. Application December 10, 1954
Serial No. 474,609

18 Claims. (Cl. 260—47)

This invention relates to polyglycidyl ethers of polyhydric alcohols, commonly referred to as epoxy ether resins, and particularly to an improved composition for curing said resins.

It is known that epoxy ether resins are useful in the manufacture of varnishes, enamels, molding compositions, adhesives, films, fibers, molded articles, and the like. In order to cure or harden such epoxy ether resins and compositions containing them, various types of curing agents have been proposed, such as alkalies, sodium or potassium hydroxide, alkaliphenoxides like sodium phenoxides; carboxylic acids or anhydrides such as formic acid, oxalic acid or phthalic anhydride; Friedel-Crafts metal halides like aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; and amino compounds such as triethyl amine, ethylene diamine, diethyl amine, diethylene triamine, triethylene tetramine, pyridine, piperidine, dicyandiamide, m-phenylenediamine, melamine and the like. These substances are added and mixed with the epoxy resin or composition containing it in order to effect the curing or hardening thereof, the amounts varying considerably depending upon the particular agent or mixture of agents employed.

From among the foregoing hardening agents, the aromatic amines, especially m-phenylenediamine, are employed as the hardener for the epoxy resin because of the distinct advantage of producing a cured resin or composition of high heat distortion resistance. m-Phenylenediamine in substantially pure form, however, suffers the disadvantage of being a relatively high melting material, melting at approximately 60°–63° C. When used in commercial practice, it is necessary to melt the m-phenylenediamine and mix it with the epoxy resin to be hardened. The mixture will react at room temperature to form a hard resin representing a "B" stage resin. Under the influence of heat which may range anywhere from three to four hours at about 150° C. a complete cure of the epoxy resin is achieved. Since m-phenylenediamine is a solid and difficult to incorporate into the epoxy resin, whether the resin be a liquid at room temperature or liquefied by the application of heat, it is still necessary to blend the m-phenylenediamine with the resin at the melting point of the m-phenylenediamine which in the commercial grade may range anywhere from 70° to 80° C. This operation is very hazardous and in many instances a highly exothermic reaction has been set off under this condition. The high temperature required to melt the m-phenylenediamine results in a relatively high temperature of the potting liquid thereby shortening the pot life of the resin.

In view of the foregoing shortcoming, attempts have been made to employ liquid amines as curing agents which would produce a material of high heat distortion resistance but without success.

It is an object of the present invention to provide a liquid catalyst adaptable for the initial or "B" stage curing of epoxy ether resins at room temperature followed by complete cure at elevated temperatures.

Other objects and advantages will become apparent from the following specification.

We have found that blends of m-phenylenediamine containing from 10 to 50 percent by weight of a compound or a mixture of compounds selected from the class having the following formulae:

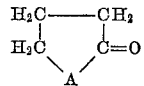

and

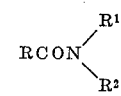

wherein A represents either oxygen, =NH,

or an =N-alkyl group, e.g., N-methyl, N-ethyl, N-propyl, N-butyl, etc., R represents either hydrogen or an alkyl group, e.g. methyl, ethyl, propyl, butyl, octyl, etc., $R^1$ represents either hydrogen, allyl, or an alkyl group, e.g., methyl, ethyl, propyl, or butyl groups, and $R^2$ represents an alkyl group of the same value as $R^1$, are liquid at ordinary room temperatures, i.e. above 30° F. and exceptionally adaptable as liquid catalysts for blending with liquid epoxy ether resins.

The liquid catalysts react to the "B" stage at room temperature and cure the resin at elevated temperatures to the same degree of hardness as that obtained by the use of commercial m-phenylenediamine. The high temperature distortion point of the cured castings, as determined by the ASTM 648–45T method, is approximately the same as that obtained with m-phenylenediamine. The electrical properties are identical and exceptionally good.

The liquid catalysts prepared in accordance with the present invention are different from the existing liquid amines, etc., in that they will advance liquid epoxy resins rapidly to a "B" stage, which is stable for several months. All other presently known liquid amine type catalysts cause exothermic reactions and advance to an infusible stage, unless no reaction is initiated at all.

As illustrative specific compounds which may be used as such or in admixture, and hereinafter referred to for sake of expediency as "liquefiers," characterized by the foregoing general formulae, the following may be mentioned:

| | |
|---|---|
| 2-pyrrolidone | N,N-diethyl acetamide |
| N-methyl-2-pyrrolidone | N,N-dipropyl acetamide |
| N-ethyl-2-pyrrolidone | N-allyl propionamide |
| N-isopropyl-2-pyrrolidone | N-methyl propionamide |
| N-vinyl-2-pyrrolidone | N-ethyl propionamide |
| Butyrolactone | N-propyl propionamide |
| N-allyl formamide | N,N-dimethyl propionamide |
| N-methyl formamide | N,N-diethyl propionamide |
| N-ethyl formamide | N,N-dipropyl propionamide |
| N-propyl formamide | N-allyl butyramide |
| N-butyl formamide | N-methyl butyramide |
| N,N-dimethyl formamide | N-ethyl butyramide |
| N,N-diethyl formamide | N-propyl butyramide |
| N,N-dipropyl formamide | N,N-dimethyl butyramide |
| N,N-diisopropyl formamide | N,N-diethyl butyramide |
| N-allyl acetamide | N,N-dipropyl butyramide |
| N-methyl acetamide | N-allyl tert. butyramide |
| N-ethyl acetamide | N-octyl caprylamide |
| N-propyl acetamide | N-octyl capramide |
| N-butyl acetamide | N-tert. butyl capramide |
| N,N-dimethyl acetamide | |

The unusual feature of the blends of m-phenylenediamine containing any one or a mixture of the above liquefiers is that when some of the blends are chilled at temperatures below zero they may freeze to a solid mass, but on attaining room temperature they liquefy without crystallization. Various blends were prepared in accordance with the present invention and after cooling to room temperature, the liquids were placed in a deep freeze at —28° C. and kept there overnight. They were then permitted to stand until they reached room temperature, and were examined twenty-four hours later for presence of crystals as will be shown hereinafter.

The liquid curing agents of the present invention are particularly adaptable for the curing of epoxy ether resins characterized by the following general formula:

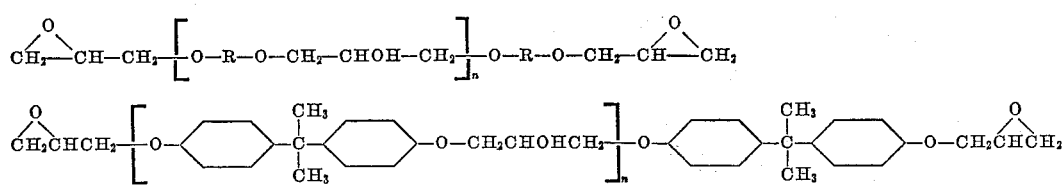

wherein R represents the divalent hydrocarbon radical of the dihydric phenol and $n$ represents the extent of copolymerization. The epoxy ether resins have an epoxide equivalent which ranges from 140 to 290. By the term "epoxide equivalent," as employed herein and in the appended claims is meant the grams of resin containing one gram equivalent of epoxide.

The liquid epoxy ethers are obtained by the procedures described in United States Patents 2,500,600; 2,633,458; 2,642,412; 2,324,483; 2,444,333; 2,520,145; 2,521,911 and 2,651,589; all of which are incorporated herein by reference for examples of the types of epoxy ether resins that may be employed for curing with our liquid catalysts.

Of the several types of epoxy ether resins with varying epoxide equivalents, we prefer to employ those having an epoxide equivalent ranging between 140–165 and 225–290, preferably between 190–210 because of its low melting point 8–12° C. (as determined by Durran's mercury method) and ease of formulation with the liquid catalysts.

In preparing the liquid curing catalyst of the present invention, 50 to 90 parts by weight of m-phenylenediamine and 10 to 50 parts by weight of any one of the foregoing liquefiers as such or mixtures thereof are dispersed until a uniform mixture is obtained, and the resulting mixture heated in any suitable container to 90°–100° C. During the heating, the mixture is stirred and the heating continued until a uniform melt is obtained. The time required to obtain a uniform melt may range from 5 minutes to 3 hours. The liquid mixture is then cooled to room temperature and filtered, after which it is ready for use as a curing agent.

Blends of two or more liquefiers may be employed to effectuate solution of the m-phenylenediamine at the specified temperature and time of heating. The curing results obtained by such a mixture of liquefiers when blended with m-phenylenediamine in the aforestated proportions are approximately the same as those obtained with a single liquefier blended with m-phenylenediamine. For example, we have found that mixtures consisting of 2 to 60 parts by weight of N-methyl-2-pyrrolidone and 40 to 98 parts by weight of any one of the N-alkyl- and N,N-dialkyl-formamides and acetamides yield liquefying mediums for the m-phenylenediamine and that the resulting blends are equal to the blends obtainable by the use of the single liquefiers.

Compounds such as o-phenylenediamine may be added to the various blends prepared in accordance with the present invention in a concentration ranging from 0.05 to 5.0% as melting point depressors.

Various blends of m-phenylenediamine with 2-pyrrolidone, N-diethylacetamide, N-dimethylformamide, etc., were prepared by employing the aforestated temperatures. After cooling and filtration, the blends were observed for appearance at room temperature and after freezing at —28° C. The parts employed were all by weight. The results obtained are shown in Tables I and II.

TABLE 1

*Properties of liquefied m-phenylenediamine blends*

|  | 1 | 2 | 3 | 4 | 5 | 6 |
|---|---|---|---|---|---|---|
| m-Phenylenediamine | 50.0 | 60.0 | 65.0 | 70.0 | 72.0 | 75.0. |
| N-Methyl-2-pyrrolidone | 50.0 | 40.0 | 35.0 | 20.0 | 28.0 | 25.0. |
| Appearance of fresh melt at room temperature | Liquid | Liquid | Liquid | Liquid | Liquid | Liquid. |
| Appearance at —28° C | do | Solid | Solid | Solid | Solid | Solid. |
| Final appearance after regaining room temperature. | do | Liquid | Liquid | Sl. crystallized on bottom. | Liquid | Liquid, some crystal ppn. |

TABLE 2

*Properties of liquefied m-phenylenediamine*

|  | 1 | 2 | 3 | 4 | 5 |
|---|---|---|---|---|---|
| m-Phenylenediamine | 50.0 | 70.0 | 80.0 | 70.0 | 80.0. |
| 2-Pyrrolidone | 50.0 |  |  |  |  |
| N-N-Dimethyl formamide |  | 30.0 | 20.0 |  |  |
| N-N-Diethyl acetamide |  |  |  | 30.0 | 20.0. |
| Appearance of fresh melt at room temperature. | Liquid | Liquid | Liquid | Liquid | Liquid. |
| Appearance at —28° C | Viscous liquid | Moderately viscous liquid. | Moderately viscous undercooled liquid. | Solid | Solid. |
| Final appearance after regaining room temperature. | Liquid | Liquid | Much crystallization on bottom. | do | Do. |

In order to determine the effect of the liquid catalyst when compared with solid m-phenylenediamine upon the physical properties of a cured epoxy ether resin, seven experiments were conducted, and the results obtained are shown in the following table. In experiment 1, 15 parts of solid m-phenylenediamine were blended with 100 parts of an epoxy ether resin having an epoxy equivalent of 190–210 and the mixture heated between 70°–80° C. until the m-phenylenediamine was uniformly dispersed in the epoxy ether resin. In experiments 2 to 7 inclusive, from approximately 15 to 20 parts of a mixture of liquid catalyst were added which was obtained by heating a mixture of 70 parts of m-phenylenediamine and 30 parts of N-methyl-2-pyrrolidone at approximately 100° C. for 1–2 hours with stirring. The liquid blend was allowed to cool to room temperature and filtered. The samples, after incorporation of the curing catalyst at room temperature, were allowed to cure at room temperature until the solid "B" stage was reached followed by one-half hour in an oven at 100° C. and 3½ hours at 150° C. All parts given are by weight. The castings when subjected to physical tests gave the results shown in Table 3.

TABLE 3

*Epon resin castings*

|  | 1 | 2 | 3 | 4 | 5 | 6 | 7 |
|---|---|---|---|---|---|---|---|
| Epon Resin (Epoxide Eq. 190-210) | 100.0 | 100.0 | 100.0 | 100.0 | 100.0 | 100.0 | 100.0 |
| m-Phenylenediamine | 15.0 | 15.0 | 12.25 | 15.0 | 12.2 | 15.0 | 12.2 |
| N-Methyl-2-pyrrolidone |  | 6.5 | 5.25 | 5.0 | 3.5 | 4.06 | 3.05 |
| Ratio of m-Phenylenediamine to liquefier |  | 70/30 | 70/30 | 75/25 | 75/25 | 80/20 | 80/20 |
| Heat Distortion Temperature, ° C | 138 | 103 | 106 | 114.5 | 120.5 | 118.5 | 124 |
| Shore D Hardness | 88 | 88 | 88 | 88 | 88 | 88 | 88 |

All bars were cured at room temperature, to the "B" stage, for 48 hours, then baked 4 hours at 150° C.

In order to determine the appearance, impact, Izod and flexural strength of laminates obtained by coating Fiberglas cloth with Epon resin containing a 70/30 blend of m-phenylenediamine/N-methyl-2-pyrrolidone as a curing catalyst, three experiments were conducted and compared with a laminate in which the resin was cured by means of 15 parts of m-phenylenediamine to 100 parts of resin. In these experiments ¼″ of laminates were prepared by coating each of 20 layers of Fiberglas cloth followed by lay-up in a wooden frame ¼″ thick. The assembly was placed between glass panels, using Mylar film as separator. A 5-pound weight was placed on top to insure proper thickness and remove recess resin. The assembly was permitted to cure to the "B" stage at room temperature for a period of 72 hours, and then post-cured for 3½ hours at 150° C. The resin content of the laminates was approximately 50%. The composition and test results are summarized in Table 4.

TABLE 4

*Epon resin laminates*

|  | 1 | 2 | 3 |
|---|---|---|---|
| Composition: |  |  |  |
| Epon Resin (Epoxide Eq. 190-210) | 100.0 | 100.0 | 100.0 |
| 70/30 Blend of m-Phenylenediamine/N-Methyl-2-pyrrolidone |  | 17.5 | 21.5 |
| m-Phenylenediamine | 15.0 |  |  |
| Cured Laminates: |  |  |  |
| Appearance |  | Dull | Glossy | Glossy |
| Impact, Izod, ft./lbs |  | 18 | 19.5 | 18 |
| Flexural Strength, (ASTM D-790-49T), lbs | 44,250 | 48,575 | 46,000 |

From the foregoing illustrations it becomes clearly manifest that the liquid curing agents of the present invention are much easier to measure, handle and incorporate into liquid Epon resin formulations and Epon resin compositions than the solid m-phenylenediamine catalyst or resinous m-phenylenediamine adduct type catalyst. From the heat distortion points shown in the above tables it becomes clearly evident that the liquid catalysts of the present invention exert a slight plasticizing effect.

It is to be noted that although some of our liquid catalysts after freezing at −28° C. and at attaining room temperature may contain some crystals and in some instances may revert to a partial solid state. This is not detrimental from a practical point of view, since in the manufacture of our liquid catalysts for commercial consumption, they will not be precooled to −28° C. After the preparation of the blend, cooling to room temperature and filtering, the blends can be stored in containers for a long period of time. If solidification should occur, they can be readily remelted and brought back to room temperature prior to mixing with epoxy resins.

We claim:

1. A heat curable liquid composition comprising a glycidyl polyether of a dihydric phenol having an epoxide equivalent ranging from 140 to 290, 50 to 90 parts of m-phenylenediamine and 10 to 50 parts of at least one liquefier compound selected from the group consisting of compounds having the following general formulae:

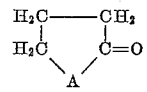

and

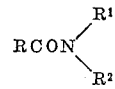

wherein A represents a member selected from the group consisting of O, NH, N-vinyl and N-alkyl groups, R represents a member selected from the group consisting of hydrogen and alkyl groups, $R^1$ represents a member selected from the group consisting of hydrogen, allyl and alkyl groups, and $R^2$ represents an alkyl group.

2. A heat curable liquid composition comprising a glycidyl polyether of a dihydric phenol having an epoxide equivalent ranging from 140 to 290, 50 to 90 parts of m-phenylenediamine and 10 to 50 parts of a liquefier consisting of N-methyl-2-pyrrolidone.

3. A heat curable liquid composition comprising a glycidyl polyether of a dihydric phenol having an epoxide equivalent ranging from 140 to 290, 50 to 90 parts of m-phenylenediamine and 10 to 50 parts of a liquefier consisting of butyrolactone.

4. A heat curable liquid composition comprising a glycidyl polyether of a dihydric phenol having an epoxide equivalent ranging from 140 to 290, 50 to 90 parts of m-phenylenediamine and 10 to 50 parts of a liquefier consisting of N,N-dimethyl formamide.

5. A heat curable liquid composition comprising a glycidyl polyether of a dihydric phenol having an epoxide equivalent ranging from 140 to 290, 50 to 90 parts of m-phenylenediamine and 10 to 50 parts of a liquefier consisting of N,N-diethyl acetamide.

6. A heat curable liquid composition comprising a glycidyl polyether of a dihydric phenol having an epoxide equivalent ranging from 140 to 290, 50 to 90 parts of m-phenylenediamine and 10 to 50 parts of a mixture consisting of 2 to 60 parts of N-methyl-2-pyrrolidone and 40 to 98 parts of a liquefier consisting of N,N-dimethyl formamide.

7. A heat curing composition comprising a liquid glycidyl polyether of a dihydric phenol having an epoxide equivalent ranging from 140 to 290 in admixture with a curing amount of a liquid catalyst comprising 50 to 90 parts of m-phenylenediamine and 10 to 50 parts of at least one liquefier compound selected from the group consisting of compounds of the following general formulae:

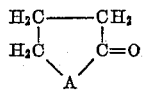

and

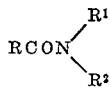

wherein A represents a member selected from the group consisting of O, NH, N-vinyl and N-alkyl groups, R represents a member selected from the group consisting of hydrogen and alkyl groups, $R^1$ represents a member selected from the group consisting of hydrogen, allyl and alkyl groups, and $R^2$ represents an alkyl group.

8. A heat curing composition according to claim 7 wherein the liquid catalyst comprises 50 to 90 parts of m-phenylenediamine and 10 to 50 parts of a liquefier consisting of N-methyl-2-pyrrolidone.

9. A heat curing composition according to claim 7 wherein the liquid catalyst comprises 50 to 90 parts of m-phenylenediamine and 10 to 50 parts of a liquefier consisting of butyrolactone.

10. A heat curing composition according to claim 7 wherein the liquid catalyst comprises 50 to 90 parts of m-phenylenediamine and 10 to 50 parts of a liquefier consisting of N,N-dimethyl formamide.

11. A heat curing composition according to claim 7 wherein the liquid catalyst comprises 50 to 90 parts of m-phenylenediamine and 10 to 50 parts of a liquefier consisting of N,N-diethyl acetamide.

12. A heat curing composition according to claim 7 wherein the liquid catalyst comprises 50 to 90 parts of m-phenylenediamine and 10 to 50 parts of a mixture consisting of 2 to 60 parts of N-methyl-2-pyrrolidone and 40 to 98 parts of a liquefier consisting of N,N-dimethyl formamide.

13. A process of hardening into an infusible state a liquid glycidyl polyether of a dihydric phenol having an epoxide equivalent ranging from 140 to 290 which comprises incorporating, in a curing amount, in said liquid glycidyl polyether a liquid catalyst comprising 50 to 90 parts of m-phenylenediamine and 10 to 50 parts of at least one liquefier compound selected from the group consisting of compounds of the following general formulae:

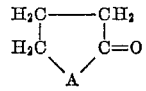

and

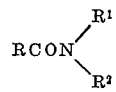

wherein A represents a member selected from the group consisting of O, NH, N-vinyl and N-alkyl groups, R represents a member selected from the group consisting of hydrogen and alkyl groups, $R^1$ represents a member selected from the group consisting of hydrogen, allyl and alkyl groups, and $R^2$ represents an alkyl group, and curing the mixture of liquid catalyst and said liquid glycidyl polyether by the application of heat.

14. A process according to claim 13 wherein the liquid catalyst comprises 50 to 90 parts of m-phenylenediamine and 10 to 50 parts of a liquefier consisting of N-methyl-2-pyrrolidone.

15. A process according to claim 13 wherein the liquid catalyst comprises 50 to 90 parts of m-phenylenediamine and 10 to 50 parts of a liquefier consisting of butyrolactone.

16. A process according to claim 13 wherein the liquid catalyst comprises 50 to 90 parts of m-phenylenediamine and 10 to 50 parts of a liquefier consisting of N,N-dimethyl formamide.

17. A process according to claim 13 wherein the liquid catalyst comprises 50 to 90 parts of m-phenylenediamine and 10 to 50 parts of a liquefier consisting of N,N-diethyl acetamide.

18. A process according to claim 13 wherein the liquid catalyst comprises 50 to 90 parts of m-phenylenediamine and 10 to 50 parts of a mixture consisting of 2 to 60 parts of N-methyl-2-pyrrolidone and 40 to 98 parts of a liquefier consisting of N,N-dimethyl formamide.

References Cited in the file of this patent

UNITED STATES PATENTS 2,651,589    Shokal et al. _____ Sept. 8, 1953

FOREIGN PATENTS 630,663    Great Britain _____ Oct. 18, 1949